United States Patent

Ishii et al.

[11] Patent Number: 5,931,251
[45] Date of Patent: Aug. 3, 1999

[54] METHOD OF CONTROLLING AUTOMATIC TRANSMISSIONS DURING TRACTION CONTROL

[75] Inventors: Shigeru Ishii, Atsugi; Yoshihide Shinso; Tateki Jozaki, both of Zama, all of Japan

[73] Assignee: Nissan Motor Co., Ltd, Yokohama, Japan

[21] Appl. No.: 08/763,899

[22] Filed: Dec. 11, 1996

[30] Foreign Application Priority Data

Dec. 14, 1995 [JP] Japan .................................. 7-325730

[51] Int. Cl.$^6$ .................................................. B60K 41/12
[52] U.S. Cl. .............................................. 180/197; 701/87
[58] Field of Search ................................ 701/55, 56, 87; 180/197

[56] References Cited

U.S. PATENT DOCUMENTS

| | | | |
|---|---|---|---|
| 5,262,952 | 11/1993 | Tsuyama et al. | 701/87 |
| 5,383,125 | 1/1995 | Hibi | 701/87 |
| 5,403,247 | 4/1995 | Yagi | 180/197 |
| 5,405,301 | 4/1995 | Yagi et al. | 180/197 |
| 5,628,378 | 5/1997 | Saito et al. | 701/87 |

FOREIGN PATENT DOCUMENTS 64-32934  2/1989  Japan .

Primary Examiner—Lanna Mai
Assistant Examiner—Avraham H. Lerner
Attorney, Agent, or Firm—Foley & Lardner

[57] ABSTRACT

A method of controlling automatic transmissions during traction control for reducing engine output upon occurrence of a skid of a driving wheel comprises moving in a high throttle valve opening area a predetermined shift line on the low vehicular speed side, and moving the predetermined shift line on the high vehicular speed side in a low throttle valve opening area.

10 Claims, 4 Drawing Sheets

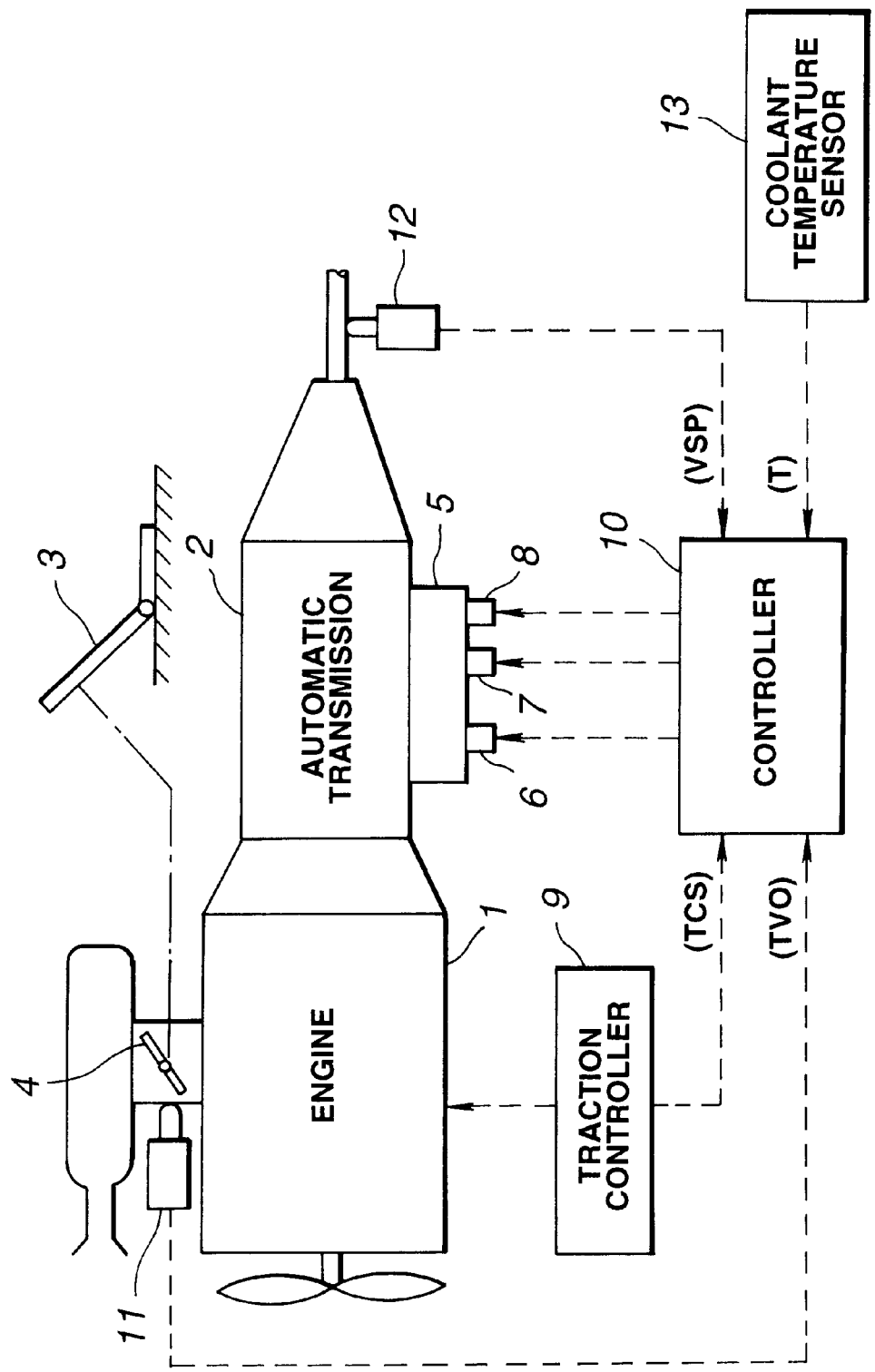

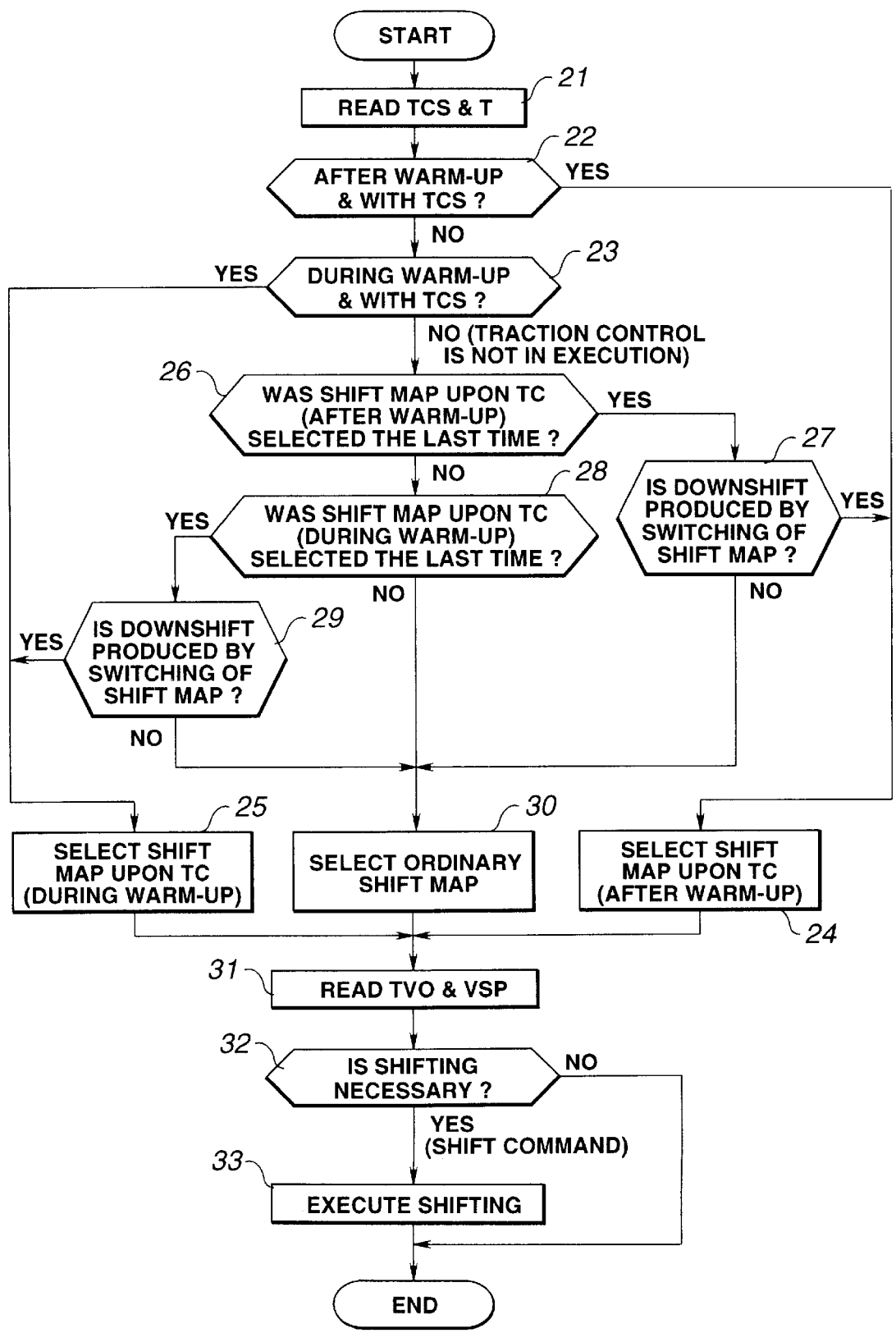

SHIFT PATTERN UPON TRACTION CONTROL (AFTER WARM-UP)

SHIFT PATTERN UPON TRACTION CONTROL (AFTER WARM-UP)

1

METHOD OF CONTROLLING AUTOMATIC TRANSMISSIONS DURING TRACTION CONTROL

BACKGROUND OF THE INVENTION

The present invention relates to a method of controlling automatic transmissions during traction control.

An automatic transmission is constructed to determine a power transmission route or gear ratio of a transmission gear through selective hydraulic operation or engagement of friction elements such as clutch and brake, and carry out shifting to another gear ratio through switching of friction elements actuated. Determination whether or not shifting should be made is carried out in accordance with predetermined shift lines defined by the opening of a throttle valve of an engine and the vehicular speed. Specifically, determination of shifting to another gear ratio is normally carried out when the operating state given by the throttle valve opening and the vehicular speed crosses the corresponding shift line.

Referring to FIGS. 3A–3C, the above predetermined shift lines are generally established as indicated, e.g. by fully-drawn lines in FIGS. 3A–3C in connection with a dry road on which a motor vehicle cruises the most frequently. Experience reveals that the following problem arises when traction control is carried out to reduce engine output upon occurrence of a skid of a driving wheel on a low-friction road.

In the high throttle valve opening area, there is an excessive tendency to select a low gear ratio, increasing the engine speed, resulting in enlarged rotational inertia energy of the engine upon shifting. Since the enlarged rotational inertia energy is apt to cause a skid of a driving wheel upon shifting, traction control often comes into action, having a tendency to degraded operability of the motor vehicle. On the other hand, in the low throttle valve opening area, there is an excessive tendency to select a high gear ratio, decreasing the engine speed, which can be lower than a lower limit value thereof which allows traction control. Thus, impossible traction control can occur, resulting in possible degradation of the operability of the motor vehicle.

As for conventional shift line control during traction control, JP-A 64-32934 proposes an art of changing the entirety of a downshift line in the direction of low vehicular speed during traction control.

With such art of changing the entirety of a downshift line during traction control, however, if a shift line is changed to solve the inconvenience in the low throttle valve opening area, the inconvenience in the high throttle valve opening area becomes more striking than that in the conventional art. On the other hand, if a shift line is changed to solve the inconvenience in the high throttle valve opening area, the inconvenience in the low throttle valve opening area becomes more striking than that in the conventional art.

It is, therefore, an object of the present invention to provide a method of controlling automatic transmissions during traction control without any degradation of the operability of the motor vehicle.

SUMMARY OF THE INVENTION

According to one aspect of the present invention, there is provided a method of controlling an automatic transmission for a motor vehicle with a driving wheel in accordance with shift determination carried out through a predetermined shift line defined by the opening of a throttle valve and the vehicular speed, the method comprising the steps of:

moving in a high throttle valve opening area the predetermined shift line on the low vehicular speed side when traction control is in execution for reducing engine output upon occurrence of a skid of the driving wheel; and moving the shift line on the high vehicular speed side in a low throttle valve opening area when traction control is in execution.

Another aspect of the present invention lies in providing a system for controlling an automatic transmission for a motor vehicle with a driving wheel in accordance with shift determination carried out through a predetermined shift line defined by the opening of a throttle valve and the vehicular speed, the system comprising:

means for moving in a high throttle valve opening area the predetermined shift line on the low vehicular speed side when traction control is in execution for reducing engine output upon occurrence of a skid of the driving wheel; and means for moving the shift line on the high vehicular speed side in a low throttle valve opening area when traction control is in execution.

BRIEF DESCRIPTION OF THE DRAWINGS

FIG. 1 is a block diagram showing a shift control system for an automatic transmission to which the present invention is applied;

FIG. 2 is a flowchart showing a shift control program executed by a controller in the shift control system;

DETAILED DESCRIPTION OF THE INVENTION

Figure 3A:
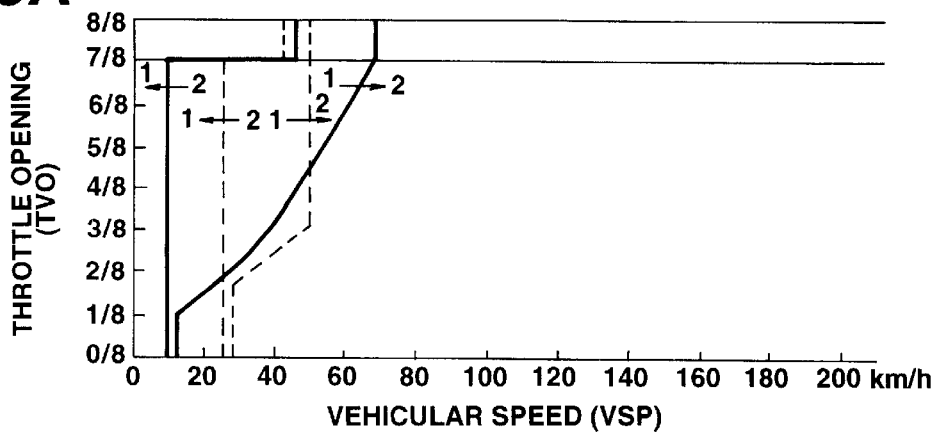
FIG. 3A is a graph illustrating a shift pattern of a 1–2 shift line after warm-up.

Referring to FIG. 1, a motor vehicle comprises an engine 1, an automatic transmission 2, and a shift control system for an automatic transmission to which the present invention is applied. Output of the engine 1 is adjusted by a throttle valve 4 which varies from the fully-closed state to the fully-open state in accordance with a depression of an accelerator pedal 3 operated by a driver. A gear ratio of the automatic transmission 2 is determined by a control valve 5, i.e. a combination of turn-on and turn-off of shift solenoids 6–8, in accordance with which engine torque is changed.

Output of the engine 1 is adjusted not only by the throttle valve 4, but by a traction controller 9. Specifically, the traction controller 9 serves to determine an acceleration skid of a driving wheel in accordance with a signal derived from a wheel revolution sensor, not shown, so as to decrease engine output when the acceleration skid occurs.

Turn-on and turn-off of the shift solenoids 6–8 are controlled by a controller 10 which receives a signal derived from a throttle opening sensor 11 for sensing an opening TVO of the throttle valve 4, a signal derived from a vehicular speed sensor 12 for sensing a vehicular speed VSP in accordance with a revolution of an output shaft of the automatic transmission 2, a signal derived from a coolant temperature sensor 13 for sensing a coolant temperature T of the engine 1, and a signal TCS derived from the traction controller 9 and indicative that traction control is in execution.

Referring to FIG. 2, the controller 9 executes a control program in accordance with the above input information so as to carry out the following shift control of the automatic transmission 2. At a step 21, the traction control signal TCS and the engine coolant temperature T are read in a memory. At subsequent steps 22 and 23, it is determined whether the engine state is during warm-up or after warm-up in accordance with the engine coolant temperature T, and whether or not traction control is in execution in accordance with a presence of the traction control signal TCS.

Figure 3B:
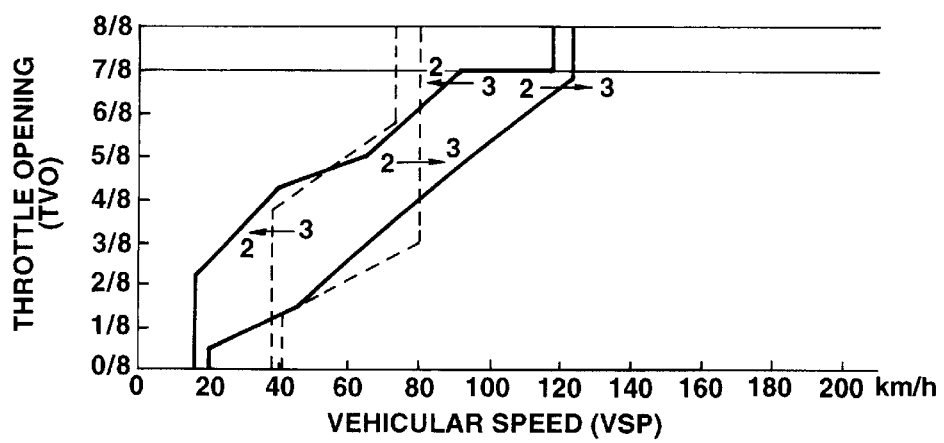
FIG. 3B is a view similar to FIG. 3A, illustrating a shift pattern of a 2–3 shift line after warm-up.
Figure 3C:
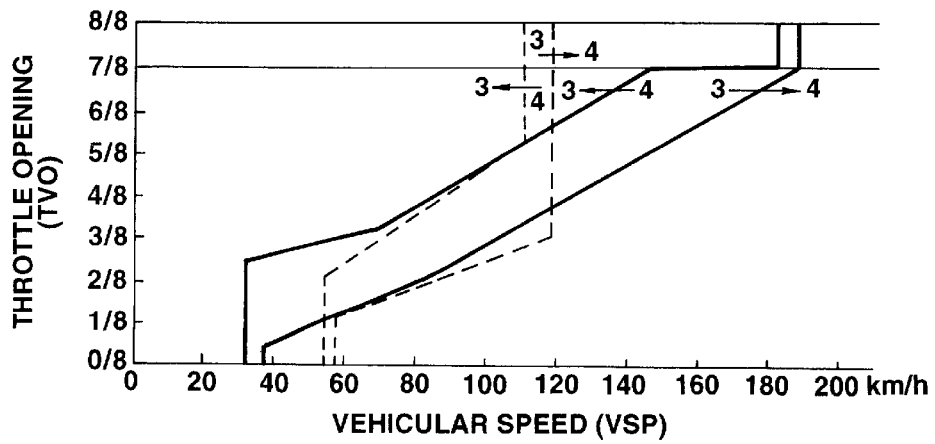
FIG. 3C is a view similar to FIG. 3B, illustrating a shift pattern of a 3–4 shift line after warm-up.

At the step 22, if it is determined that the engine state is after warm-up and that traction control is in execution, control proceeds to a step 24 where a shift map during traction control and after warm-up is selected. Referring to FIGS. 3A–3C, this shift map includes ordinary upshift and downshift lines as indicated by fully-drawn lines, and changed upshift and downshift lines as indicated by broken lines which are moved on the low vehicular speed side in the high throttle valve opening area, and on the high vehicular speed side in the low throttle valve opening area.

Figure 4A:
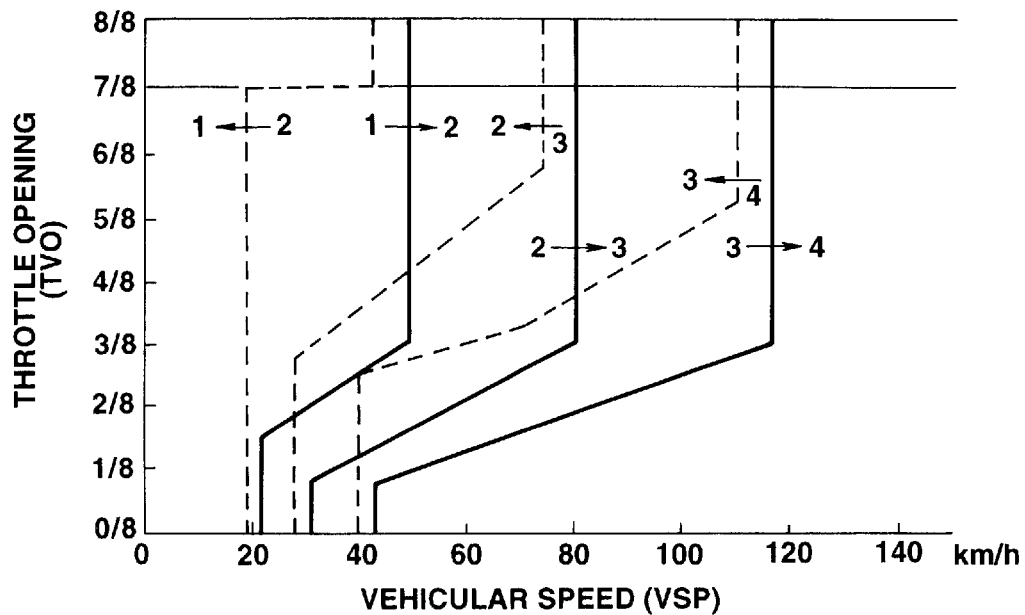
FIG. 4A is a view similar to FIG. 3C, illustrating a shift pattern of the 1–2, 2–3, and 3–4 shift lines during traction control and after warm-up.

Referring to FIG. 4A, the upshift and downshift lines as indicated by the broken lines in FIGS. 3A–3C are collectively shown in a single drawing which constitutes a shift pattern or map during traction control and after warm-up. In FIG. 4A, the upshift lines are indicated by fully-drawn lines, and the downshift lines are indicated by broken lines.

Figure 4B:
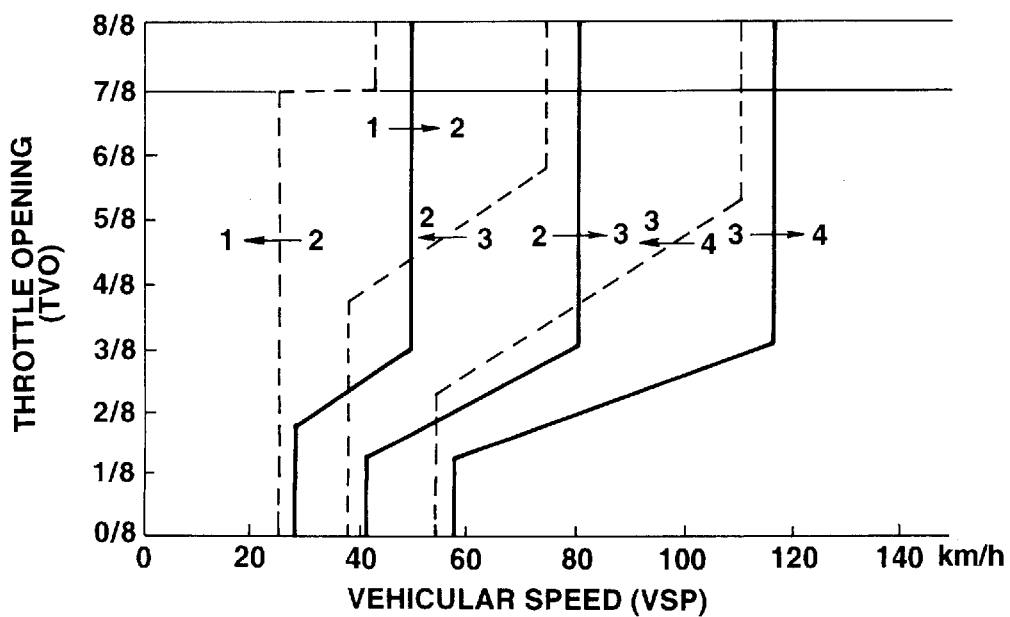
FIG. 4B is a view similar to FIG. 4A, illustrating a shift pattern of the 1–2, 2–3, and 3–4 shift lines during traction control and during warm-up.

At the step 23, if it is determined that the engine state is during warm-up and that traction control is in execution, control proceeds to a step 25 where a shift map during traction control and during warm-up is selected. Referring to FIG. 4B, this shift map includes upshift and downshift lines obtained by moving those as shown in FIG. 4A on the high vehicular speed side in the low throttle valve opening area. Therefore, in the shift map during traction control and during warm-up as shown in FIG. 4B, a high-vehicular-speed-side altered amount of the upshift and downshift lines in the low throttle valve opening area is larger than that in the shift map during traction control and after warm-up as shown in FIG. 4A.

At the steps 22 and 23, if it is determined that traction control is not in execution, control proceeds to a step 26 where it is determined whether or not the shift map during traction control and after warm-up as shown in FIG. 4A was selected the last time through execution of the step 24. That is, at the step 26, it is determined whether or not shift control passed from the state during traction control and after warm-up to the state with no traction control. If the answer at the step 26 is YES, control proceeds to a step 27 where it is determined whether or not downshift is produced when carrying out, in accordance with a passage to the state with no traction control, a return from the shift map during traction control and after warm-up as shown in FIG. 4A to the shift map with ordinary shift lines as indicated by fully-drawn lines in FIG. 3A, 3B or 3C.

At the step 27, if it is determined that downshift is produced, control proceeds to the step 24 where the shift map during traction control and after warm-up as shown in FIG. 4A is continuously selected without carrying out a return to the shift map with ordinary shift lines as indicated by fully-drawn lines in FIG. 3A, 3B or 3C. On the other hand, if it is determined that downshift is not produced, control proceeds to a step 30 where a return is carried out to the shift map with ordinary shift lines as indicated by fully-drawn lines in FIG. 3A, 3B or 3C. That is, when shift control passes from the state during traction control and after warm-up to the state with no traction control, a return from the shift map during traction control and after warm-up to the shift map with ordinary shift lines is delayed until downshift cannot be produced.

At a step 28, it is determined whether or not the shift map during traction control and during warm-up as shown in FIG. 4B was selected the last time through execution of the step 25. That is, at the step 28, it is determined whether or not shift control passed from the state during traction control and during warm-up to the state with no traction control. If the answer at the step 28 is YES, control proceeds to a step 29 where it is determined whether or not downshift is produced when carrying out, in accordance with a passage to the state with no traction control, a return from the shift map during traction control and during warm-up as shown in FIG. 4B to the shift map with ordinary shift lines as indicated by fully-drawn lines in FIG. 3A, 3B or 3C.

At the step 29, if it is determined that downshift is produced, control proceeds to the step 25 where the shift map during traction control and during warm-up as shown in FIG. 4B is continuously selected without carrying out a return to the shift map with ordinary shift lines as indicated by fully-drawn lines in FIG. 3A, 3B or 3C. On the other hand, if it is determined that downshift is not produced, control proceeds to the step 30 where a return is carried out to the shift map with ordinary shift lines as indicated by fully-drawn lines in FIG. 3A, 3B or 3C. That is, when shift control passes from the state during traction control and during warm-up to the state with no traction control, a return from the shift map during traction control and during warm-up to the shift map with ordinary shift lines is delayed until downshift cannot be produced.

Needless to say, in the steady state that no traction control continues, a loop including the steps 21–23, 26, 28 and 30 is repeatedly carried out to execute the step 30 where the shift map with ordinary shift lines as indicated by fully-drawn lines in FIG. 3A, 3B or 3C is continuously selected.

At a step 31, the throttle valve opening TVO and the vehicular speed VSP are read in the memory. At a subsequent step 32, shift determination is carried out as follows. In accordance with a shift pattern selected at any of the steps 24, 25 and 30, a target gear ratio is obtained out of read values of the throttle valve opening TVO and the vehicular speed VSP, and is compared with an actually selected gear ratio. If the target gear ratio corresponds to the actually selected gear ratio, it is determined that shifting is not necessary, and control comes to an end. On the other hand, if the target gear ratio does not correspond to the actually selected gear ratio, control proceeds to a step 33 where a shift command is generated to execute shifting from the actually selected gear ratio to the target gear ratio through switching of turn-on and turn-off of the shift solenoids 6–8.

During shift control, as described above, when traction control is carried out to reduce engine output upon occurrence of a skid of a driving wheel, i.e. when the traction control signal TCS is detected, the above shifting is ensured in accordance with the shift pattern or map as shown in FIGS. 4A and 4B including changed shift lines which are moved on the low vehicular speed side in the high throttle valve opening area, and on the high vehicular speed side in the low throttle valve opening area as compared with ordinary shift lines as indicated by fully-drawn lines in FIGS. 3A–3C, obtaining the following effect:

Moving shift lines on the low vehicular speed side in the high throttle valve opening area serves to remove an excessive tendency to select a low gear ratio, and to allow selection of a high gear ratio, enabling a decrease in the engine speed. Thus, rotational inertia energy of the engine is not great upon shifting in the high throttle opening valve area, enabling solution of the problem of frequent occurrence of a skid of a driving wheel, i.e. degraded operability of the motor vehicle due to the fact that traction control often comes into action.

Moreover, moving shift lines on the high vehicular speed side in the low throttle valve opening area serves to remove an excessive tendency to select a high gear ratio, and to allow selection of a low gear ratio, enabling an increase in the engine speed. Thus, the engine speed cannot be lower than a lower limit value thereof which allows traction control, removing occurrence of impossible traction control, resulting in possible solution of the problem of degraded operability of the motor vehicle.

According to the method of the present invention, the shift line can individually be changed with the throttle valve opening area during traction control so as to meet requirements in the throttle valve opening area, enabling simultaneous solution of the above problems which vary with the throttle valve opening area.

Moreover, according to the method of the present invention, during traction control, a high-vehicular-speed-side altered amount of the shift lines in the low throttle valve opening area is larger during warm-up as shown in FIG. 4B than after warm-up as shown in FIG. 4A. Thus, the above effect that a tendency to select a low gear ratio is enlarged in the low throttle valve opening area to increase the engine speed can be more striking during warm-up.

Therefore, in conformity with the fact that a lower limit value of the engine speed which allows traction control is larger during warm-up than after warm-up, the engine speed cannot be lower than a lower limit value thereof which allows traction control even during warm-up, removing occurrence of impossible traction control, resulting in possible solution of the problem of degraded operability of the motor vehicle even during warm-up.

Moreover, when shift control passes from the state during traction control to the state with no traction control in accordance with a result of determination at the steps 27 and 29 in FIG. 2, a return from the shift map during traction control as shown in FIG. 4A or 4B to the shift map with ordinary shift lines as indicated by fully-drawn lines in FIG. 3A, 3B or 3C is delayed through continuous selection of the step 24 or 25 until the operating state of the motor vehicle ensures no occurrence of downshift even with a return of the shift map. Thus, this passage of shift control is carried out without any singularity of downshift produced with a return of the shift map.

Having described the present invention in connection with the preferred embodiment, it is noted that the present invention is not limited thereto, and various changes and modifications can be made without departing from the spirit of the present invention.

What is claimed is:

1. A method of controlling an automatic transmission driven by an engine of a motor vehicle to drive a driving wheel thereof, in accordance with shift determination carried out through a predetermined shift pattern defined by the opening of a throttle valve, which is responsive to a degree of an accelerator pedal depression, and the vehicular speed, wherein the shift pattern includes both the up-shift and down-shift lines, the method comprising:

moving the predetermined shift lines, while executing traction control to reduce engine output to prevent the driving wheel from skidding, such that shifting occurs at a lower vehicular speed when the throttle valve opening degree is greater than a predetermined value; and moving the predetermined shift lines, while executing traction control, such that shifting occurs at a higher vehicular speed when the throttle valve opening degree is lower than said predetermined value.

2. A method as claimed in claim 1, further comprising determining if the engine is in a warming-up state or a warmed-up state, and moving the predetermined shift lines such that shifting occurs at a higher vehicle speed when the engine is in the warming-up state than when the engine is in the warmed-up state.

3. A method as claimed in claim 2, further comprising:

preparing a third shift map for use when the engine is in the warming-up state while executing traction control;

preparing a fourth shift map for use when the engine is in the warmed-up state while executing traction control;

preparing a fifth shift map for use when not executing traction control.

4. A method as claimed in claim 1, further comprising:

preparing a first shift map for use during a traction control state and a second map for use during a non-traction control state;

determining whether a shift control has changed from the traction control state to a non-traction control state;

determining whether a downshift would occur if the second map were used in the non-traction control state; and delaying the use of the second map upon determining that the shift control changed from the traction control state to the non-traction control state until no downshift would occur if the second map were used.

5. A system for controlling an automatic transmission driven by an engine of a motor vehicle to drive a driving wheel thereof, in accordance with shift determination carried out through a predetermined shift pattern defined by the opening of a throttle valve, which is responsive to a degree of an accelerator pedal depression, and the vehicular speed, wherein the shift pattern includes both the up-shift and down-shift lines, the system comprising:

means for moving the predetermined shift lines, while executing traction control to reduce engine output to prevent the driving wheel from skidding, such that shifting occurs at a lower vehicular speed when the throttle valve opening degree is greater than a predetermined value; and means for moving the predetermined shift lines, while executing traction control, such that shifting occurs at a higher vehicular speed when the throttle valve opening degree is lower than a predetermined value.

6. A system as claimed in claim 5, further comprising means for determining if the engine is in a warming-up state or a warmed-up state, and means for moving the predetermined shift lines such that shifting occurs at a higher vehicle speed when the engine is in the warming-up state than when the engine is in the warmed-up state.

7. A system as claimed in claim 6, further comprising:

a third shift map for use when the engine is in the warming-up state while executing traction control;

a fourth shift map for use when the engine is in the warmed-up state while executing traction control;

a fifth shift map for use when not executing traction control.

8. A system as claimed in claim 5, further comprising:

a first shift map for use during a traction control state;

a second map for use during a non-traction control state;

means for determining whether a shift control has changed from the traction control state to a non-traction control state;

means for determining whether a downshift would occur if the second map were used in the non-traction control state; and means for delaying the use of the second map upon determining that the shift control changed from the traction control state to the non-traction control state until no downshift would occur if the second map were used.

9. A system for controlling an automatic transmission driven by an engine of a motor vehicle to drive a driving wheel thereof in accordance with shift determination, the system having a traction controller that prevents the driving wheel from skidding, the system comprising:

a throttle valve associated with the engine to adjust an output thereof;

an accelerator manipulable to control an opening degree of the throttle valve to adjust the engine output;

a throttle valve-opening sensor that detects the opening degree of the throttle valve;

a speed sensor that indicates the vehicle speed;

a shift controller connected to the throttle valve opening sensor and the vehicular speed sensor, the controller including a predetermined shift pattern, which includes predetermined up-shift and down-shift lines, that is defined based on the opening of the throttle valve and the vehicular speed, wherein the shift controller determines the shift lines when the traction control is both operating and not operating, and wherein the shift controller, while the traction control is executing, changes the predetermined shift lines such that shifting occurs at a lower vehicle speed when the throttle valve opening degree is greater than a predetermined value and shifting occurs at a higher vehicle speed when the throttle valve opening degree is less than the predetermined value.

10. A system as claimed in claim 9, further including a sensor that determines whether the engine is warmed-up or warming-up, the sensor being connected to the shift controller, wherein the shift controller changes the predetermined shift lines such that shifting occurs at a higher vehicle speed when the engine is warming-up than when the engine is warmed-up.

* * * * *